United States Patent
Kitada et al.

(10) Patent No.: US 7,216,070 B2
(45) Date of Patent: May 8, 2007

(54) SYSTEM AND METHOD FOR MANAGING DOCUMENTS WITH MULTIPLE APPLICATIONS

(75) Inventors: Hiroshi Kitada, Tuckahoe, NY (US); Akio Kizawa, Ridgewood, NJ (US)

(73) Assignees: Ricoh Company, Ltd., Tokyo (JP); Ricoh Corporation, San Jose, CA (US)

( * ) Notice: Subject to any disclaimer, the term of this patent is extended or adjusted under 35 U.S.C. 154(b) by 787 days.

(21) Appl. No.: 10/294,607

(22) Filed: Nov. 15, 2002

(65) Prior Publication Data

US 2003/0217095 A1    Nov. 20, 2003

Related U.S. Application Data

(60) Provisional application No. 60/374,811, filed on Apr. 24, 2002.

(51) Int. Cl.
*G06G 7/48* (2006.01)
*G06F 15/16* (2006.01)

(52) U.S. Cl. ............................... 703/6; 709/201
(58) Field of Classification Search ............ 703/6; 709/201
See application file for complete search history.

(56) References Cited

U.S. PATENT DOCUMENTS

| | | | |
|---|---|---|---|
| 5,323,393 A | 6/1994 | Barrett et al. | |
| 5,428,782 A | 6/1995 | White | |
| 5,666,490 A | 9/1997 | Gillings et al. | |
| 5,694,601 A | 12/1997 | White | |
| 5,793,964 A | 8/1998 | Rogers et al. | |
| 5,862,404 A | 1/1999 | Onaga | |
| 6,009,442 A | 12/1999 | Chen et al. | |
| 6,020,973 A | 2/2000 | Levine et al. | |
| 6,023,722 A | 2/2000 | Colyer | |
| 6,119,137 A | 9/2000 | Smith et al. | |
| 6,125,372 A | 9/2000 | White | |
| 6,189,069 B1 | 2/2001 | Parkes et al. | |
| 6,209,048 B1 | 3/2001 | Wolff | |
| 6,219,718 B1 | 4/2001 | Villalpando | |
| 6,262,732 B1 | 7/2001 | Coleman et al. | |
| 6,327,045 B1 | 12/2001 | Teng et al. | |
| 6,330,611 B1 | 12/2001 | Itoh et al. | |

(Continued)

FOREIGN PATENT DOCUMENTS

JP    11-249847    9/1999

(Continued)

*Primary Examiner*—Hugh Jones
(74) *Attorney, Agent, or Firm*—Oblon, Spivak, McClelland, Maier & Neustadt, P.C.

(57) ABSTRACT

A method and system for managing documents, where the system includes a document manager server connected to image processing devices and to applications via a network. The document manager server receives an identification from the image processing devices; looks up a profile and transmits the profile to the image processing devices. The profile includes information about the applications connected to the document manager server. The document manager server can receive a job information, e.g., a document, from the image processing devices; process the job information and transmit the processed information to the applications connected to the document manager server. The applications can include for example an e-mail server, a fax server, a file format conversion system, an optical character recognition system, a document management system and a file storage system.

52 Claims, 14 Drawing Sheets

U.S. PATENT DOCUMENTS

| | | |
|---|---|---|
| 6,424,424 B1 | 7/2002 | Lomas et al. |
| 6,434,343 B1 * | 8/2002 | Kobayashi et al. ............. 399/8 |
| 6,477,567 B1 | 11/2002 | Ohara |
| 6,480,304 B1 | 11/2002 | Os et al. |
| 6,496,206 B1 | 12/2002 | Mernyk et al. |
| 6,567,121 B1 | 5/2003 | Kuno |
| 6,578,067 B1 | 6/2003 | Okazaki et al. |
| 6,694,376 B1 | 2/2004 | Ohara |
| 6,738,841 B1 | 5/2004 | Wolff |
| 6,785,023 B1 | 8/2004 | Iida |
| 6,947,182 B1 * | 9/2005 | Kumagai .................... 358/402 |
| 2002/0099707 A1 | 7/2002 | Matsumoto |
| 2005/0021608 A1 | 1/2005 | Wolff |

FOREIGN PATENT DOCUMENTS

| | | |
|---|---|---|
| JP | 11-275291 | 10/1999 |
| JP | 2000-47771 | 2/2000 |
| JP | 2000-172720 | 6/2000 |
| JP | 2000-295401 | 10/2000 |
| JP | 2000-311095 | 11/2000 |
| JP | 2000-354124 | 12/2000 |
| JP | 2001-125759 | 5/2001 |
| JP | 2001-169069 | 6/2001 |
| JP | 2001-225531 | 8/2001 |
| JP | 2001-345983 | 12/2001 |

* cited by examiner

SYSTEM AND METHOD FOR MANAGING DOCUMENTS WITH MULTIPLE APPLICATIONS

BACKGROUND OF THE INVENTION

1. Field of the Invention

The present invention is directed to methods and computer-based systems for managing documents or files between multi-function devices and various network applications.

2. Discussion of the Background

Over the past several years, there has been an increase in the number and types of document-related applications available over networks. These applications can include document management systems, such as those specializing in managing documents of various specific contents, for example medical, legal, financial, marketing, scientific, educational, etc. Other applications include various delivery systems, such as e-mail servers, facsimile servers, regular mail delivery. Yet other applications include document processing systems, such as format conversion and optical character recognition.

Various systems for accessing these network applications from image processing devices (e.g., scanners, printers, copy machines, cameras) have been contemplated. One system associates a computer with each image processing device for managing the documents with the network applications. The computers communicate with the various network applications to enable the use of these applications by the user of the image processing devices. For example, the computers request and receive from the network applications information about the format and content of the data required by the applications to manage documents. The computers process this information and configure the image processing devices to provide the correct format and content.

Such systems, however, have a number of drawbacks, especially if considered within an environment of a relatively large office with numerous image processing devices and using different kinds of network document applications, which may change over time. Specifically, the requirement of having a computer for each image processing device increases cost and decreases flexibility. This requirement creates the burden of maintaining, securing and upgrading the computers. When a new application is integrated within the system, each computer and/or each image processing device must be updated and made compatible with the new network application. The task of updating each local computer and/or each image processing device creates a costly burden on the administrator of the system, and severely increases the traffic over the company's network. This increase in traffic can slow down the company's entire network. As another drawback, any confidential information required to use the network is relatively vulnerable because each of the local computers and image processing devices is exposed to a security breach.

SUMMARY OF THE INVENTION

The present inventors have determined that there is a need for more efficiently managing documents between image processing devices and various network applications. The present invention provides a method and a system that satisfies this need.

The system of the present invention includes at least one image processing device, such as a multi-function device, but preferably several image processing devices, a document manager server connected to the image processing devices and network applications connected to the document manager server. The document manager server functions as a kind of agent for the image processing devices and a kind of gateway to the network applications.

The document manager server receives an identification from the image processing devices; looks up a profile and transmits the profile to the image processing devices. The profile includes information about applications connected to the document manager server via a network. Based on the profile, the image processing device can adjust its user interface and can configure its functions so as to enable a user to interact with the network applications. The document manager server can receive a job information, e.g., a document, from the image processing devices; process the job information and transmit the processed information to applications connected to the document manager server. The applications can include for example an e-mail server, a fax server; a file format conversion system, an optical character recognition system, a document management system or a file storage system.

Advantageously, the system and method of the present invention allow the image processing devices to automatically be updated with information for using an application newly incorporated onto the network. This updating of the image processing devices can be performed efficiently by the document manger server for any of the image processing devices. Individual image processing devices need not be upgraded with new firmware, which is costly and time consuming. The document manager server can efficiently manage various aspects of the relationship between the image processing devices and the network applications. For example, the document manager server can manage the security of a global directory server, can manage the financial relationship (e.g., related to billing, accounting, and licensing issues) between the image processing devices and the network applications, and can process documents to and from the image processing devices and the network applications.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
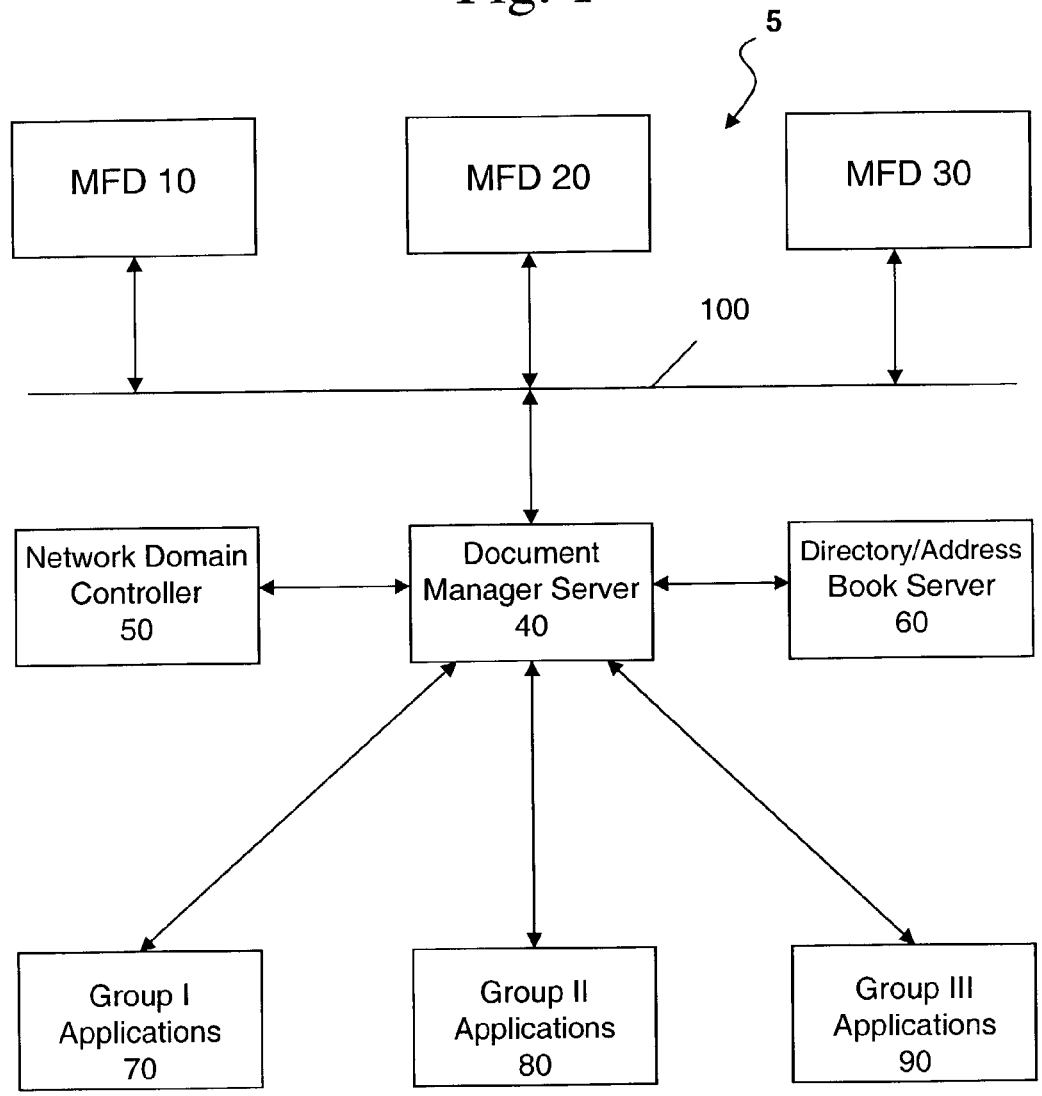
FIG. 1 is a block diagram showing an overall system configuration according to one embodiment of the present invention.

Referring now to the drawings, wherein like reference numerals designate identical or corresponding parts throughout the several views, FIG. 1 is a block diagram of a system 5 for managing documents according to the present invention, and in particular to allow a document manager server 40 to manage documents and files by processing information related to applications, which can be grouped in different groups I–III. The system 5 includes a network 100 that interconnects at least one, but preferably a plurality of image processing devices 10–30, to a document manager server 40. The network 100 preferably uses TCP/IP (Transmission Control Protocol/Internet Protocol) because this protocol is commonly used, but other protocols are possible. The network 100 can be a local area network, a wide area network, any type of network such as an intranet, an extranet, the Internet or a combination thereof. Other communications links for the network 100, such as a virtual private network, or a wireless link, may be used as well.

As shown in FIG. 1, the devices 10–30 can be multifunction devices, or "MFDs." An MFD can incorporate a scanner, a copy machine, a printer, a fax machine, a digital camera, other office devices, and combinations thereof. Various types of MFDs are commonly known in the art and share common features and hardware with the MFDs of the present invention. In one embodiment of the present invention, the MFD is a portable device, such as a digital camera, connectable to the Internet via wireless connection. Such an MFD combines digital imaging with the power of the Internet so that one can capture still, sounds or videos and share them wirelessly from various locations. The MFD can create web pages, send and receive e-mails with attachments, edit images, FTP files, surf the Internet, and send a fax. In another embodiment, the MFD is a multiple scanner, photocopier and printer, as described in more detail below with corresponding FIGS. 11–12.

As shown in FIG. 1, the document manager server 40 is connected to a directory server 60 (or "address book server" or "global directory"). The directory server 60 can include information such as the names, addresses, network addresses, e-mail addresses, phone/fax numbers, other types of destination information, and authorization of individuals. Other information can be included in the directory server 60. Examples of directory servers 60 compatible with the present invention include, but are not limited to, Lotus Notes™, Microsoft Exchange™, and LDAP ("Lightweight Directory Access Protocol") enabled directory servers. LDAP is a software protocol that enables a user to locate organizations, individuals, files, devices in a network. The document manager server 40 can also be connected to a network domain controller 50 that controls authentication of the MFD users.

Examples of a directory server 60 and a network domain controller 50 are disclosed in U.S. application Ser. No. 10/243,645, filed Sep. 16, 2002, the entire content of which is hereby incorporated by reference. Briefly, the system 5 provides access for the users of the MFDs 10–30 to the information stored at the directory server 60 via the document manager server 40. A user can request a search of the company's global directory stored at the directory server 60. The document manager server 40 can pass the search request to the directory server 60 and can receive the search results (e.g., e-mail addresses and/or fax numbers) from the directory server 60. The document manager server 40 can pass the search results to the MFD 20, which can temporarily store and display them. The user can select a displayed result (e.g., an e-mail addresses or a fax number), scan a document, and request that the scanned document be transmitted, e-mailed and/or faxed to the selected destination.

The document manager server 40 can be configured to act as an intermediate agent, or a gateway between a plurality of network applications 50, 60, 70, 80, and 90 and the MFDs. The applications 70, 80, and 90 can include for example an e-mail server, a fax server; a file format conversion system, an optical character recognition (OCR) system, a document management system and a file storage system. In a preferred embodiment, the email server is incorporated into the document manager server 40. The e-mail server can include, but is not limited to, Lotus Notes™ e-mail server, Microsoft Exchange™ e-mail server, and SMTP ("Simple Mail Transfer Protocol") e-mail servers. In a preferred embodiment, the fax server is the Captaris' RightFax™ server. The file format conversion system can be configured to convert a document from one format (e.g., TIFF, "Tag Image File Format") to another (e.g., PDF, "Portable Document Format"). An example of a document management system is disclosed in U.S. application Ser. No. 09/795,438, filed Mar. 1, 2001; and in U.S. application Ser. No. 10/116,162, filed Apr. 5, 2002, the entire contents of which are hereby incorporated by reference. Other document management systems include systems that specialize in managing documents having a specific content. As an example, the document management system can be the system implemented by the Centers for Medicare & Medicaid Services for managing medical and insurance records as provided under the Health Insurance Portability and Accountability Act (HIPAA). Other systems for managing and/or storing documents, such as legal, financial, marketing, scientific, educational, can be connected to the document manager server 40.

These applications can be grouped, for example in groups I–III. Group I can be a delivery system group including an e-mail server and a fax server; Group II can be a middle processing group including a file format conversion system and an optical character recognition system; and Group III can be a backend system group including a document management system and a file storage system. The document manager server 40 can direct documents to several applications within each group. In a preferred embodiment, the document manager server 40 delivers a document to several of the applications within the delivery system group, but delivers the document to one of the application within the middle processing group and to one of the applications of the backend system group. For example, the document manager server 40 can deliver a document to the e-mail and fax servers, to the OCR system, and to a document management system. Other combinations are possible in other embodiments.

In a preferred embodiment, the MFDs 10–30 and the document manager server 40 exchange data using the protocol HTTP ("Hypertext Transfer Protocol") or HTTPS (HTTP over Secure Socket Layer) over the network 100. Other protocols can equivalently be used with the present invention. Preferably, the MFDs 10–30 and the document manager server 40 exchange data using the format XML ("Extensible Markup Language"). Other formats, such as HTML, can equivalently be used with the present invention.

In a preferred embodiment, the document manager server 40 can include an MFD profiler 280 (shown in FIG. 2) that manages profiles for the MFDs 10–30. The administrator of the system 5 can create, change and maintain the profiles via a profile screen on the document manager server 40. A profile includes information (e.g., parameters) sent from the document manager server 40 to an MFD. Based on this information, the MFD can adjust its user interface on its display and can adjust its functions so as to properly interface with the document manager server 40. For example, the MFD can display buttons on its LCD that allow a user to select options (e.g., a particular delivery system, a middle processing system, or a backend system) available to the MFD via the document manager server 40. One information included in the profile can be the identity of the various applications 70–90 connected to the document manager server 40. The profiler 280 receives an identification information from an MFD (e.g., the serial number). The profiler uses this identification information to check whether the MFD is registered within a registrar, e.g., a data table stored in a memory of the document manager server 40. If registered, the profiler sends the MFD a profile assigned to the MFD. If the MFD is not registered, the profiler can register the MFD and send the MFD a profile. The profiler can store more than one profile. In a preferred embodiment, one profile is assigned to each MFD, and more than one MFD can share the same profile.

Examples of parameters in a profile include, but are not limited to:

A profile ID, which identifies the profile;

an LDAP Enabled parameter, which indicates whether or not the LDAP tree search is enabled on the document manager server 40 using the directory server 60;

a Base DN parameter, which provides a default field of search for the LDAP tree when the LDAP search is enabled;

a Network Authentication parameter, which indicates whether or not network authentication is enabled using the network domain controller 40;

a Time-Out parameter, which indicates the time period that should elapse before the MFD resets and requires the user to enter login information;

a Max Result Count parameter, which determines the maximum number of LDAP query result returned;

a Fax Option parameter, which indicates whether or not a fax server is connected to the document manager server 40;

a Post Scan Processing parameter, which indicates what post scan processing system is connected to the document manager server 40; and a Backend parameter, which indicates what backend system is connected to the document manager server 40. Other parameters can be included in a profile. For example, the parameters can include a specific user ID, scanning job parameters for the specific user ID, such as default size of papers, scanning resolution setting, condition of the document feeder, or department code for billing image processing operations.

Figure 2:
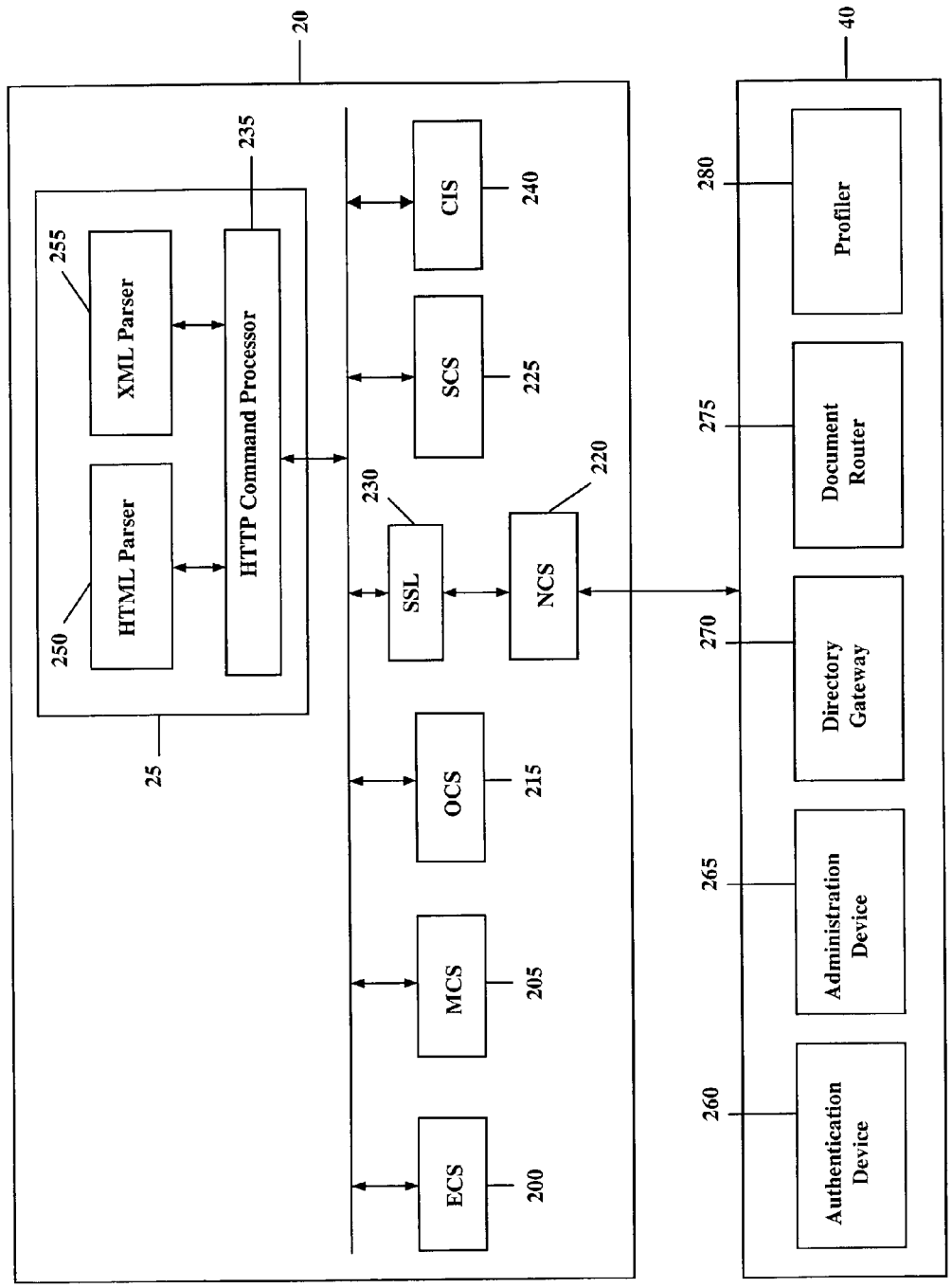
FIG. 2 is a block diagram illustrating a browser for the image processing device according to one embodiment of the present invention.

FIG. 2 illustrates an MFD 20's browser 25 configured to exchange information between the MFD 20 and the document manager server 40 according to one embodiment of the present invention. An example of a browser 25 is disclosed in U.S. application Ser. No. 10/243,643, filed Sep. 16, 2002, the entire content of which is hereby incorporated by reference. FIG. 2 shows the software components in the MFD-server system, which includes an authentication device 260 configured to perform the authentication functions discussed above. The document manager server 40 also includes an administration device 265 which allows the system administrator to administer the system 5. For example, the administrator of the system can access the profiler 280 via the administration device 265 to set user profiles and/or the MFD profiles for the MFDs 10–30 connected to the document manager server 40. The document manager server 40 also includes a directory gateway 270 configured to communicate with the directory server 60. The document manager server 40 also includes a document router 275 configured to route the documents received from the MFDs to the appropriate applications 70, 80 and 90.

As shown in FIG. 2, the MFD 20 includes an engine control service (ECS) 200 that controls for example the scanning engine of the MFD 20. A memory control service (MCS) 205 controls access to the memory of the MFD 20. An operation panel control service (OCS) 215 generates displays for the LCD of the MFD 20. For example, the OCS 215 can generate conventional menus for MFD operation and the menu shown in FIG. 3. A system control service (SCS) 225 controls and/or monitors sensors within the MFD 20. For example, the SCS 225 controls the touch screen sensors, paper jam sensors and scanning operation sensors. Accordingly, the SCS 225 can manage the status of the MFD 20 based on the information from the sensors. A network control service (NCS) 220 controls communication between the browser 25 and the document manager server 40. Optionally, a secure socket layer (SSL) 230 provides added security for communications between the NCS 220 and the browser 25. A command input service (CIS) 240 processes input information, e.g., from the LCD touch panel and a key pad of the MFD 20. A user of the MFD can enter information and commands using the LCD touch panel and the key pad. The CIS 240 can process such information and commands entered by a user (e.g., forwarded to the CIS 240 by the SCS 225). The CIS 240 can generate a command (e.g., a display command) based on such processing and transmit the command to other components of the MFD (e.g., to the OCS 215 to display a graphic on the LCD). The CIS 240 can also exchange information and commands with the NCS 220 for processing with the browser 25 in connection with the server 40.

Conventional MFDs include ECSs, MCSs, OCSs, NCSs, SCSs, and CISs which are firmware for implementing and controlling each hardware component of the MFD. In the present invention, however, the NCS 220 is configured to communicate with the browser 25. For instance, the NCS 220 has additional capabilities for communicating using the HTTP protocol. The NCS 220 is also configured to communicate with the server 40 so that the NCS 220 exchanges data between the browser 25 and the server 40. For example, The NCS 220 can transmit to the server 40 an identification and receive a profile, can transmit a request for an e-mail address and can receive from the server 40 a selected e-mail address, or the NCS 220 can transmit to the server 40 login information and can receive a user authentication confirmation from the server 40 (and from the directory server 60) during an authentication process.

The browser 25 includes an HTTP command processor 235 that communicates with the network control service (NCS) 220 of the MFD 20. For example, a request for an email address entered by the user via the MFD key pad, or a request for displaying information on the LCD, such as FIG. 3, can be passed from the NCS 220 to the browser 25 by the HTTP command processor 235. The HTTP command processor 235 can exchange data in the HTML format with the browser's HTML parser 250, and can exchange data in the XML format with the XML parser 255. The parsers 250 and 255 can check the data from the HTTP command processor 235 for syntax, process the data for HTTP command processor 235. The present invention can include conventional parsers, which are usually part of a compiler.

The HTTP command processor 235 can be provided with a program code for implementing a specific application, such as, user authentication processing which can be implemented with the directory service of the server 40. The HTTP command processor 235 can process information based on definitions of the specific application. For example, the HTTP command processor 235 can process information provided by the user, such as User Name or Password, and generate an HTTP request based on this processing for the server 40. The HTTP command processor 235 can transmit this HTTP request to the NCS 220 to be transmitted to the server 40.

The HTTP command processor 235 can also process information received from the server 40 (via the NCS 220). For example, the HTTP command processor 235 can receive an HTTP response generated by the server 40 which includes a profile with parameters for operating the MFD The HTTP command processor 235 can process this information and generate commands to control the MFD in accordance with the information, e.g., can request the MFD to display a menu with the appropriate buttons, or to scan according to the scanning job parameters for the specific user ID. As another example, the HTTP command processor 235 can generate a graphic drawing command for the LCD panel. The HTTP command processor 235 can transmit the commands to the appropriate MFD firmware (e.g., the OCS 215) so as to be executed. For example, the OCS 215 can receive the graphic drawing command and execute it by displaying a graphic (e.g., FIG. 3) on the LCD panel.

Figure 3:
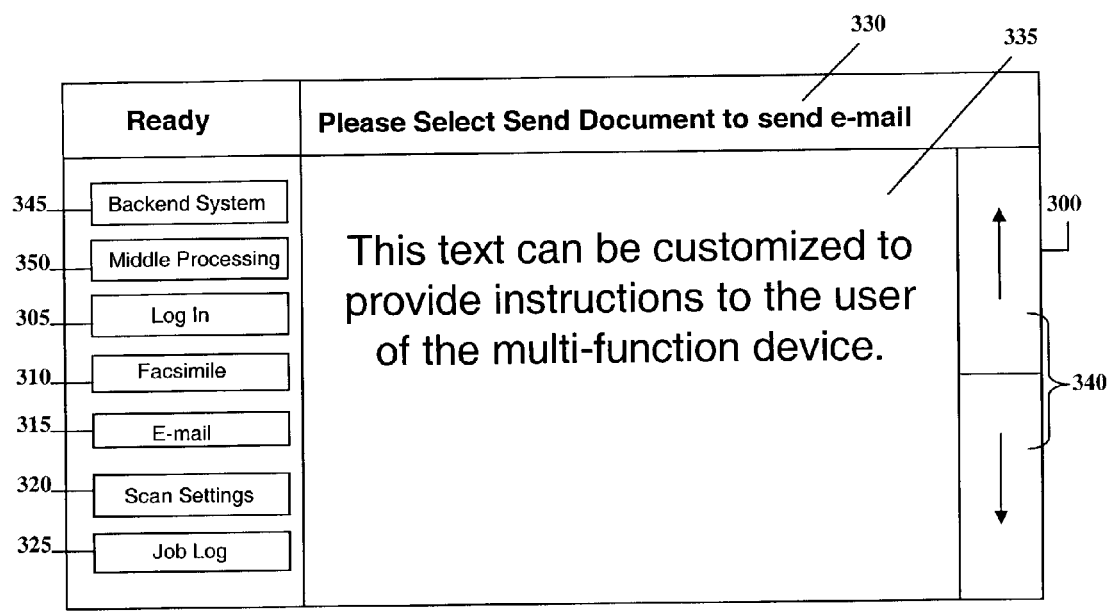
FIG. 3 shows an example of a menu displayed on a display screen of the image processing device according to one embodiment of the present invention.

FIG. 3 illustrates a screen 300 that provides instructions to the user and touch sensitive buttons, for example buttons 305–350, to use the system shown in FIG. 1. Upon touching the button 305, the MFD displays a screen (not shown) that prompts the user to enter login information. Upon touching the button 310, the MFD displays a screen (not shown) that permits the user to fax a document. Upon touching the button 315, the MFD displays a screen (not shown) that permits the user to e-mail a document. Upon touching the button 320, the MFD displays a screen (not shown) that prompts the user to enter settings for scanning a document. Upon touching the button 325, the MFD displays a screen (not shown) that displays a job log, which keeps track of previous jobs performed by the MFD. Upon touching the button 345, the MFD displays a screen (not shown) that permits the user to send a document to a back-end system. Upon touching the button 350, the MFD displays a screen (not shown) that permits the user to send a document to a middle processing system, for example to change the format of the document.

The screen 300 includes a system display portion 330 that displays system messages, such as the time and date, error messages, or instructions to the user. The screen 300 includes a main display portion 335 that displays information for the user. Screen 300 can include other display portions. The screen 300 also includes buttons 340, which permit the user to scroll through the display shown in the main display portion 335.

FIGS. 4–10 show flowcharts of methods of managing documents with the document manager server 40 according to various embodiments of the present invention. The process shown in FIG. 4A illustrates a method performed by the document manager server 40. At step 400, the document manager server 40 receives a request for a profile from an image processing device. This request can include an identification information which identifies the requesting image processing device. The identification information can include the serial number of the image processing device and/or a group identification for the image processing device. A group identification can be for example an indication that the MFD belongs to a specific division with an organization, the group having a specific function, for example legal, accounting, marketing, or having a specific location, for example a floor, a building, a town, a state, a country, or having a specific security level, etc.

At step 405, the document manager server 40 inquires whether the MFD is registered, for example by looking up the identification information in a registrar that stores registered MFDs. If the MFD is registered, the document manager server 40 finds a profile assigned to the MFD at step 410. If the MFD is not registered, the document manager server 40 can compare at step 415 the number of registered MFDs with a predetermined number. This predetermined number can be for example the maximum number of devices licensed to use a particular application connected to the document manager server 40. This predetermined number (and information identifying its associated application) can be stored at the document manager server 40, and can be for example, 5, 25, or 100, depending on the license agreement between the network application and the organization benefiting from the MFDs. License information can also be included in MFD profiles so that the MFD can adjust its user interface and functions accordingly. If the number of registered image processing devices is less than the predetermined number, the document manager server 40 can register the MFD at step 420 and find the profile assigned to the MFD at step 410. If the number of registered image processing devices is equal to the predetermined limit, the document manager server 40 can transmit a message to the MFD at step 425. The message can be an error message indicating that the services available to the document manager server are not available to the MFD because the maximum number of licensed MFDs is reached.

At step 430, the document manager server 40 checks what delivery options, e.g., fax server, e-mail server, are available and adds this information to the profile. At step 435, the document manager server 40 checks what middle processing systems are available and adds this information to the profile. At step 440, the document manager server 40 checks what backend systems are available and adds this information to the profile. At step 445, the document manager server 40 sends the profile to the registered image processing device.

The document manager server 40 can repeat the above steps for several image processing devices. If the image processing devices belong to the same group within an organization, the document manager server 40 can transmit the same profile to each of the image processing devices. After the MFD has received its profile from the document manager server 40, the MFD can create an initial display screen based on the various parameters provided in the profile, as discussed next with FIG. 4B.

Figure 4A:
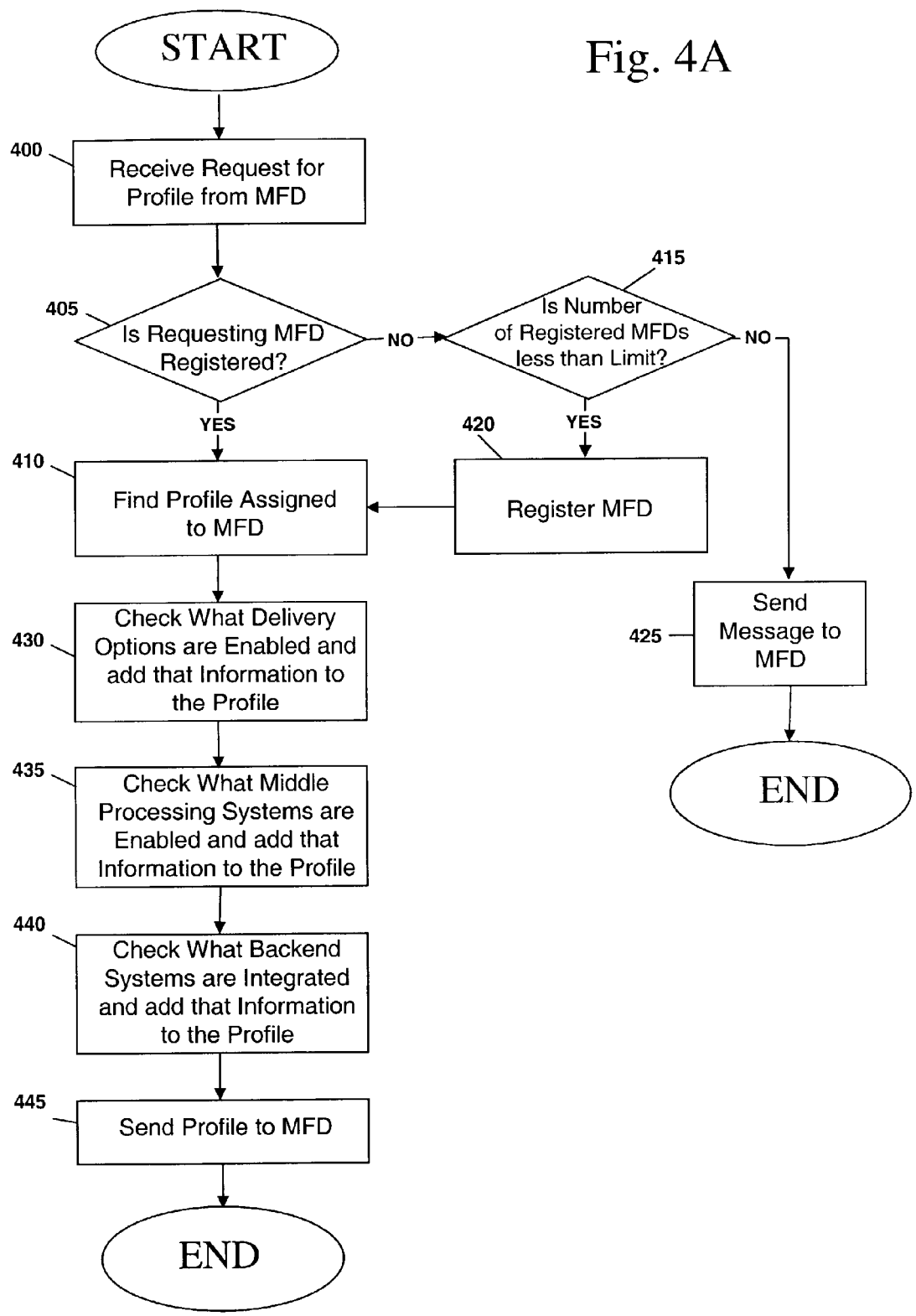
FIGS. 4–10 show flowcharts of methods of managing documents according to various embodiments of the present invention.
Figure 4B:
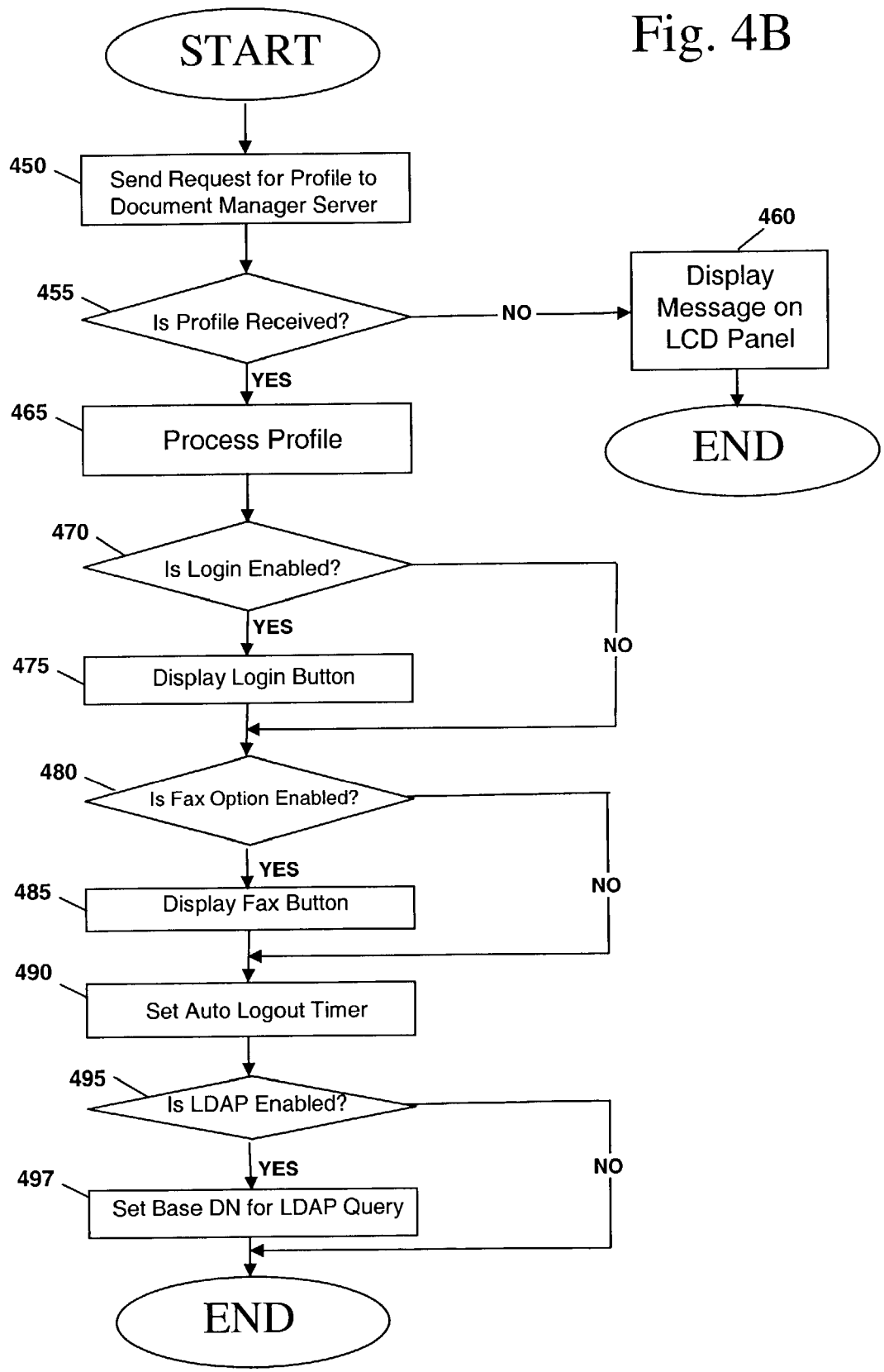

The process shown in FIG. 4B illustrates a method performed by an image processing device, e.g., an MFD, and can start, for example, when the image processing device is turned on. At step 450, the MFD sends a request for a profile to the document manager server 40. As noted above, this request can include an identification, such as the serial number of the image processing device. At step 455, the MFD inquires whether the profile has been received from the document manager sever 40. If no profile has been received but instead an error message was received from the document manager server 40, the MFD displays the message at step 460. If the profile is received, the MFD processes the profile received at step 465. As part of this processing, the MFD can generate displays as a function of the profile parameters. For example, the MFD can generate menus based on the backend and middle processing systems identified in the profile. At that step, the MFD can also display graphics on its LCD based on default settings, such as buttons 315–325, and 340 shown in FIG. 3.

The parameters provided in the profile can correspond to functions that are optional for the MFD. Other functions are enabled by default within the MFD so that the MFD displays any graphics corresponding to these functions automatically without inquiring whether the profile indicates that these default functions are enabled. Parameters corresponding to such default functions need not be part of the profile. In the example illustrated in FIG. 4B, the login, fax, and LDAP functions are optional so that the MFD inquires about their enablement by considering the parameters included in the profile. Also in this example, the e-mail function is enabled by default so that the MFD does not inquire about these functions. The present invention is not limited to this example and other combinations of optional/default functions are within the scope of the present invention.

At step 470, the MFD inquires whether its profile indicates that the login function is enabled. If the login function is enabled, the MFD displays a login button on its LCD panel at step 475. If the login function is not enabled, the MFD skips to step 480 where it inquires whether its profile indicates that the fax option is enabled. If the fax function is enabled, the MFD displays a fax button on its LCD at step 485. If the fax option is not enabled, the MFD skips to step 490 where it sets an MFD auto logout timer based on a timer value provided in the profile.

At step 495, the MFD inquires whether its profile indicates that the LDAP option is enabled. If the LDAP option is enabled, at step 497 the MFD sets a base DN ("Distinguished Name") for an LDAP query provided as part of the profile. The base DN provides a default field of search within which the LDAP search is performed unless a narrower field of search is requested. If the LDAP option is not enabled, the MFD skips the step 497. After performing these steps, the MFD has completed an initial display screen for the MFD, such as screen 300 shown in FIG. 3. The present invention is not limited to the order of the steps shown in FIGS. 4A–B.

Using this initial screen and other menus displayed by the MFD, the user of the MFD can access the various services available on the network through the document manager server 40. In general, the document manager server 40 receives a job information from the image processing device; processes the job information at the document manager server 40; and transmits a processed information to an application connected to the document manager server 40.

Figure 5:
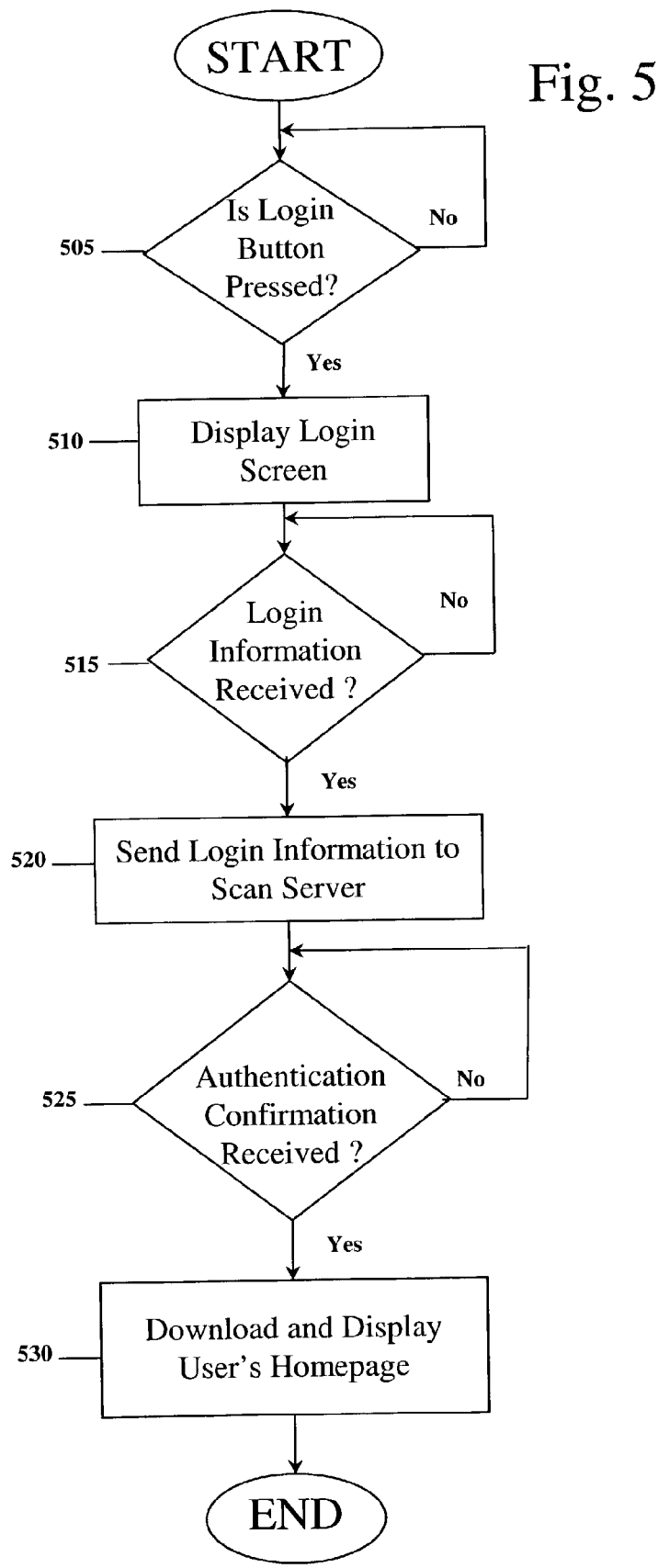

FIG. 5 illustrates a method of authenticating a user according to one embodiment of the present invention as performed by the MFDs 10–30. At step 505, the MFD inquires whether a command is received from the user to display a login screen. For example, the user can press a login button on the LCD of the MFD 20, such as the "Login" button 305 of screen 300 shown in FIG. 3. At step 510, the MFD 20 displays the login screen if the command is received. At step 315, the MFD 20 inquires whether the login information is received from the user. For example, the MFD 20 can inquire whether the user entered a user name, a password, and a domain name.

Once the login information is received, the MFD 20 sends the login information to the document manager server 40 at step 520. In this case, the job information includes the login information. The document manager server 40 receives the login information, processes it and transmits the processed login information to the network domain controller 50. The domain controller 50 verifies the login information and sends an authentication confirmation to the document manager server 40 that forwards the confirmation to the MFD 20. At step 525, the MFD 20 inquires whether the authentication confirmation is received from the document manager server 40. Once the MFD 20 receives the user authentication, the MFD 20 downloads from the document manager server 40 a user's home page for display at step 530. The user's home page can be a kind of default (portal) page initially displayed after authentication. In the present invention, this home page can be generated based on the result of user authentication. In a preferred embodiment, the user home page can be provided with a "Help" button, and/or a "About" button to provide instruction and information for using system of the present invention.

Figure 6:
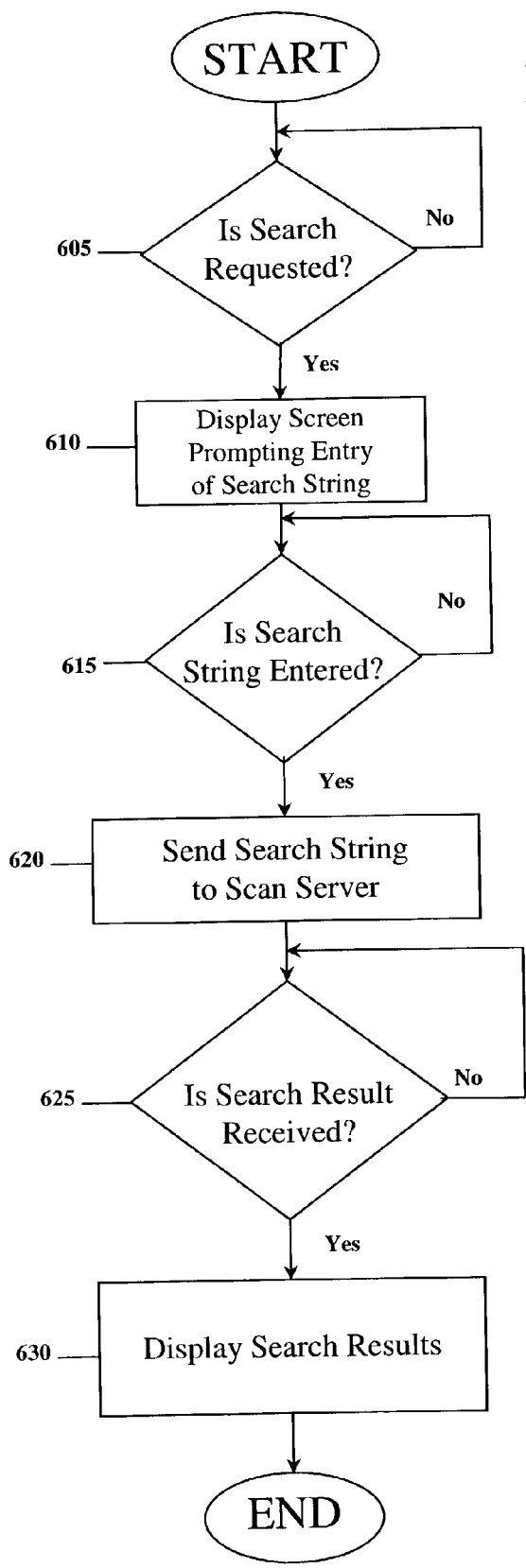

FIG. 6 illustrates a method of accessing the global directory 60 according to one embodiment of the present invention. The global directory 60 can be accessed for the purpose of performing a search for a destination information, such as a fax number search and/or an e-mail address search. At step 605, the MFD 20 inquires whether the user requested to search the global directory. For example, the user can request such a search by pressing lookup buttons shown on menus displayed on the MFD LCD. If such a search is requested, the MFD 20 displays a screen at step 610 that prompts the user to enter a search string, for example a string of at least two characters. At step 615, the MFD 20 inquires whether the search string has been entered.

Once the search string is entered, the MFD 20 sends the search string to the document manager server 40 at step 620. In this case, the job information received by the document manager server includes the request for the destination information. The document manager server 40 processes and forwards the search string to the directory server 60, which performs the search and transmits the search results to the document manager server 40. The document manager server 40 transmits the search results to the MFD 20. At step 625, the MFD 20 inquires whether the search results have been received from the document manager server 40. Once the search results are received, the MFD displays the search results on its display at step 630.

The user of the MFD can also request the document manager server 40 to route a document to an application connected to the document manager server, such as a fax server, an e-mail server, a file format conversion system, an OCR system, a document management system and a file storage system. In this case, the job information includes the document and the request for routing the document to an application.

Figure 7:
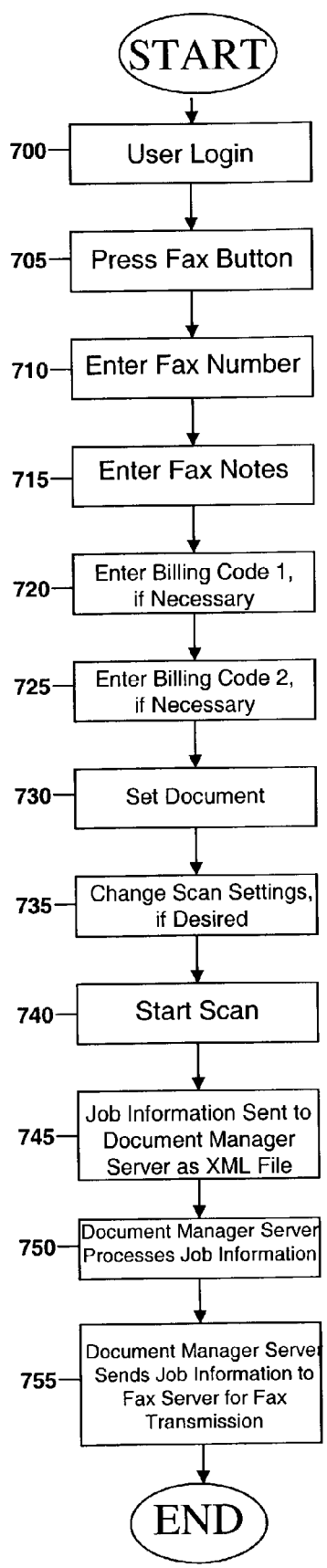

FIG. 7 shows an example of a method for sending a fax using an MFD though the document manager server 40. At step 700, the MFD user can login as discussed above with FIG. 5. At step 705, the MFD user can press a fax button, such as Fax button 310 shown in FIG. 3. At step 710, the MFD user can enter a fax number using an MFD input device, such as a touch screen or a key pad. Alternatively, the fax number can be displayed and selected after accessing the global directory 60, as discussed above with FIG. 6. At step 715, the MFD user can enter fax notes that will be transmitted along with the faxed document. The user can enter the fax notes using the MFD input device. At steps 720–725, the user can enter billing codes if required in order to fax a document from the MFD. Whether or not the entry of a billing code is required can be determined by a profile parameter. The billing code corresponds to the entity who should be billed for the fax service.

At step 730, the document can be set on the MFD scanning surface. At step 735, the scanning settings can be changed if desired, for example by accessing a scan setting menu displayed upon touching button 320 shown in FIG. 3. At step 740, the document is scanned. At step 745, the job information is sent to the document manager server 40, for example as an XML file. The job information in this case can include the scanned document, the request to route the document to the fax server, the billing codes, the scanning parameters, and the specified fax number. At step 750, the document manager server 40 processes the job information received from the MFD. At step 755, the document manager server 40 transmits at least part of the processed job information to the fax server in order to complete the fax transmission.

Figure 8:
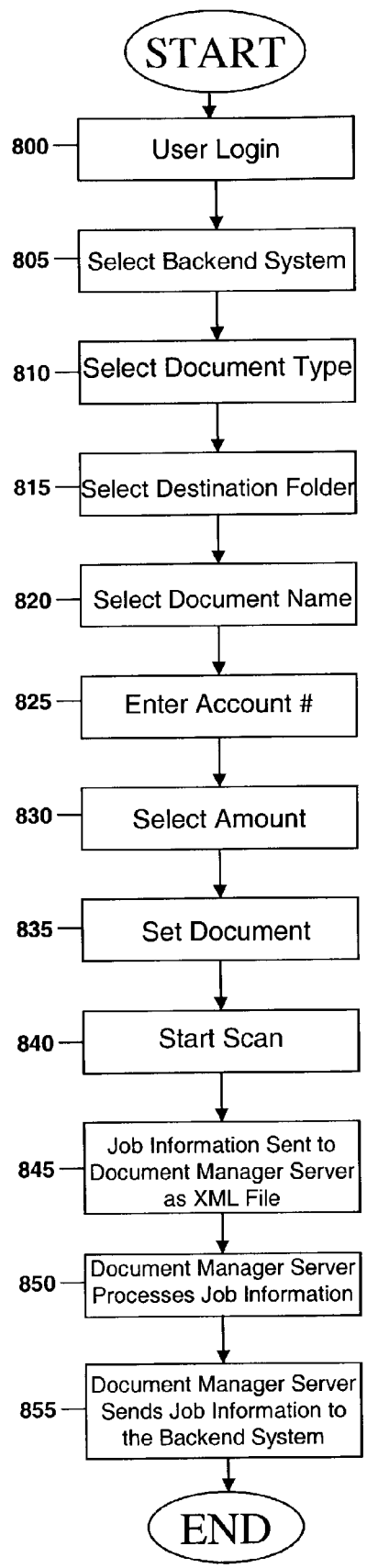

FIG. 8 shows an example of a method for sending a document to a backend system using an MFD though the document manager server 40. As mentioned above, the backend system can be for example a document management system or a file to scan system. At step 800, the MFD user can login as discussed above with FIG. 5. At step 805, the MFD user can select a backend system, such as a document management system. For example, the user can touch the button 345 shown in FIG. 3. At step 810, the MFD user can select a document type using the MFD input device. For example, a menu of document types can be displayed so that the user can select one of the types using the touch sensitive screen of the MFD. The document type can be used as index information when storing the document at the backend system. At step 815, the MFD user can select a destination folder where the document will be stored at the backend system. Again, this can be performed by selecting a folder from a list displayed on a screen, or the destination folder can be entered using a keyboard. At step 820, the MFD user can enter the name of the document and/or other indexing information. At step 825, the user can enter an account number, which can be used by the document manager server 40 and/or by the backend system for management purposes, such as billing, accounting, activity monitoring. At step 830, the user can select an amount on an invoice when the document type is an invoice. Other fields can be displayed on the MFD display in order to prompt the user to enter information (e.g., a numerical value) for different types of documents.

At step 835, the document can be set on the MFD scanning surface. At step 840, the document is scanned. At step 845, the job information is sent to the document manager server 40, for example as an XML file. The job information in this case can include the selected backend system, the scanned document, a request to route the document to the backend system, the document type, the destination folder, the document name, the account number, and the amount. At step 850, the document manager server 40 processes the job information received from the MFD. In one embodiment, the document manager server 40 sends the document to a middle processing system based on selected backend system. In other words, the document manager server 40 can recognize that the selected backend system requires a specific file format. The document manager server 40 automatically ensures that the document received from the MFD is in the proper format before sending it to the backend system. At step 855, the document manager server 40 transmits at least part of the processed job information (e.g., the document) to the backend system.

Figure 9:
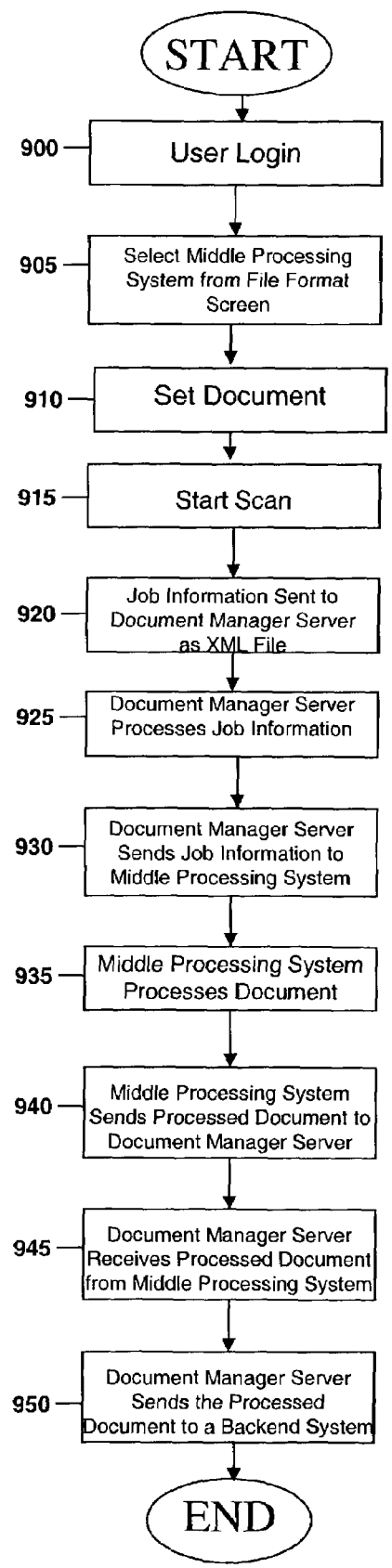

FIG. 9 shows an example of a method for sending a document, processed by a middle processing system, to a backend system using an MFD though the document manager server 40. As mentioned above, the middle processing system can be for example a file format conversion system, or an OCR system. At step 900, the MFD user can login as discussed above with FIG. 5. At step 905, the MFD user can select a middle processing system, such as an OCR system and/or a PDF conversion system. For example, the user can touch the button 350 shown in FIG. 3 to display a file format screen from which the user can select a conversion/recognition system. In an alternative embodiment, the file format screen can be displayed automatically by the MFD based on its profile, or based on the selection of the backend system, for example based on the selection made at step 805 of FIG. 8. In this embodiment, the MFD need not display a middle processing button, such as button 350. At step 910, the document can be set on the MFD scanning surface. At step 915, the document is scanned. At step 920, the job information is sent to the document manager server 40, for example as an XML file. The job information in this case can include the selected middle processing system, the scanned document, the request to route the document to the middle processing system and other systems if desired. At step 925, the document manager server 40 processes the job information received from the MFD.

At step 930, the document manager server 40 transmits at least part of the processed job information, such as the document, to the middle processing system. At step 935, the middle processing system processes the document, and at step 940, the middle processing system transmits the processed document to the document manager server 40. At step 945, the document manager server 40 receives the processed document, and at step 950 transmits the processed document to a backend system.

Figure 10:
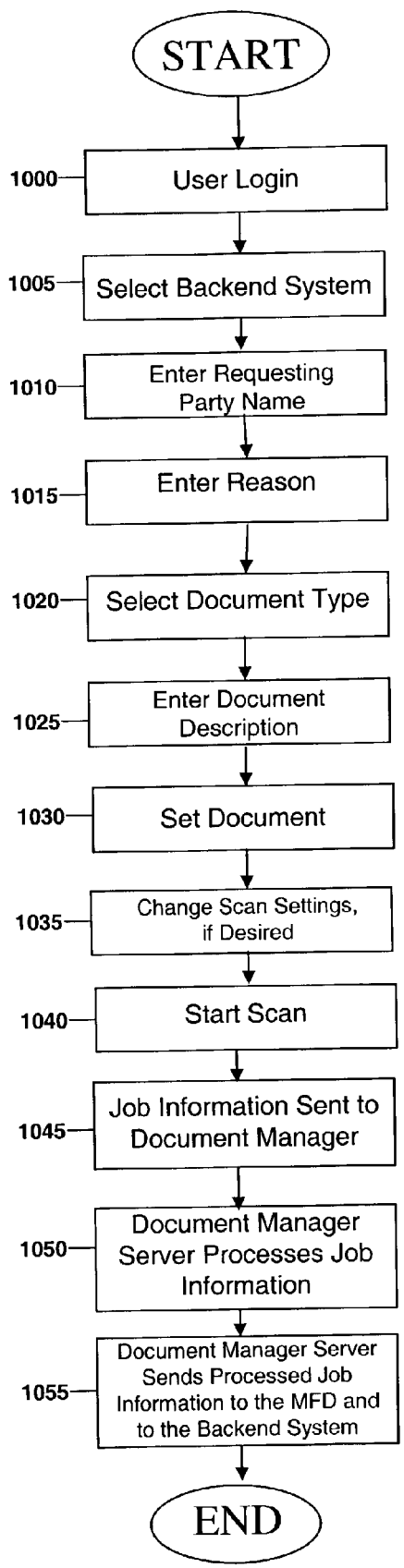

FIG. 10 shows an example of a method for sending a document to a backend system and printing out the document at an MFD though the document manager server 40. As mentioned above, the backend system can be for example a document management system or a file to scan system. In this example, the document management system manages sensitive document, such as medical and insurance records and requires certain information to keep track of who is requesting the document and why. At step 1000, the MFD user can login as discussed above with FIG. 5. At step 1005, the MFD user can select a backend system, such as a medical record document management system. For example, the user can touch the button 345 shown in FIG. 3. At step 1010, the MFD user is prompted to enter the name of the party requesting the document. At step 1015, the MFD user can enter a reason for requesting the document. This step can be performed by selecting a reason from a list displayed on a screen, or the reason can be entered using a keyboard. At step 1020, the MFD user can enter the document type and at step 1025, the user can enter the document description and/or other indexing information.

At step 1030, the document can be set on the MFD scanning surface. At step 1035, the scanning settings can be changed if desired. The setting can be changed, for example, by touching the button 320 shown in FIG. 3. At step 1040, the document is scanned. At step 1045, the job information is sent to the document manager server 40, for example as an XML file. The job information in this case can include the scanned document, the name of the requesting party, the reason for requesting the document, the document type, and the document description. At step 1050, the document manager server 40 processes the job information received from the MFD. At step 1055, the document manager server 40 transmits at least part of the processed job information to the MFD and to the backend system. For example, the document manager server 40 can send the document back to the MFD for printing, and to the document management system for storing.

Figure 11:
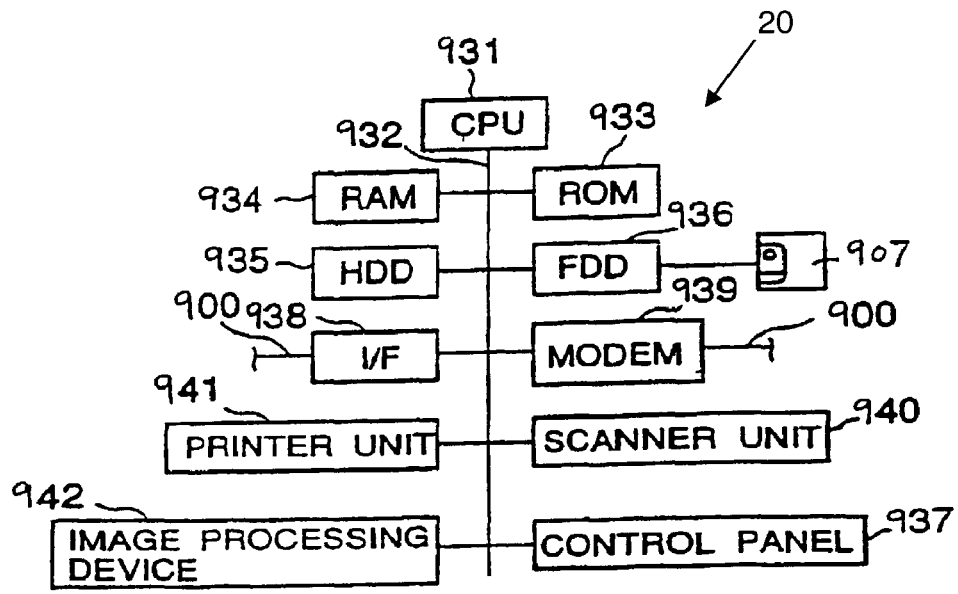
FIG. 11 is a block diagram illustrating an image processing device according to one embodiment of the present invention.
Figure 12:
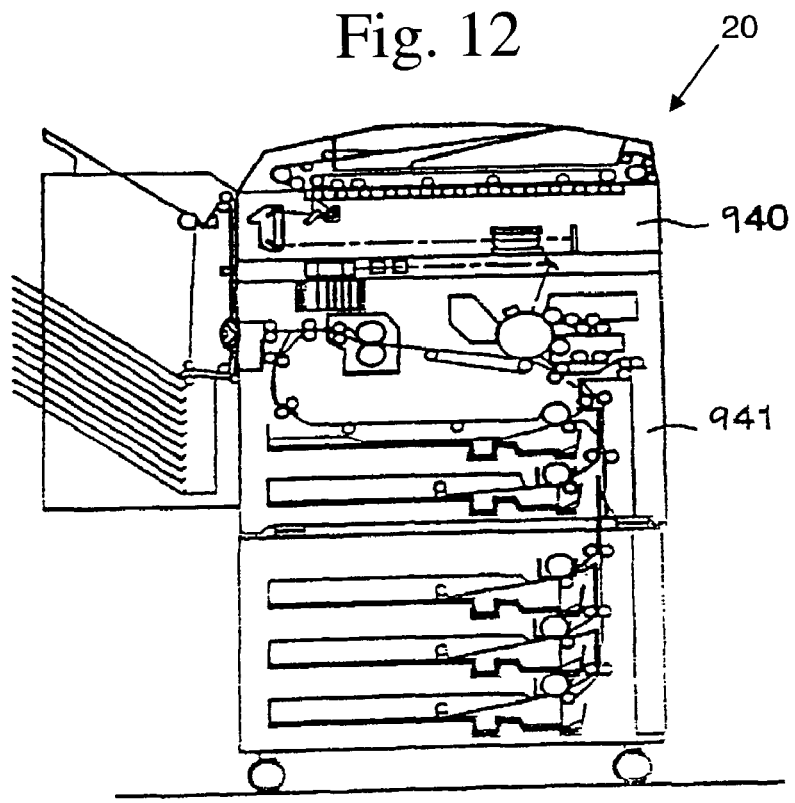
FIG. 12 is a schematic representation of an image processing device according to one embodiment of the present invention.

FIGS. 11–12 illustrate an example of the MFD 20, which includes a central processing unit (CPU) 931, and various elements connected to the CPU 931 by an internal bus 932. The CPU 931 services multiple tasks while monitoring the state of the MFD 20. The elements connected to the CPU 931 include a read only memory (ROM) 933, a random access memory (RAM) 934, a hard disk drive (HDD) 935, a floppy disk drive (FDD) 936 capable of receiving a floppy disk 907, a communication interface (I/F) 938, and a modem unit 939. In addition, a control panel 937, a scanner unit 940, a printer unit 941, and an image processing device 942 can be connected to the CPU 931 by the bus 932. Both the I/F 938 and the modem unit 939 are connected to a communication network 100.

In a preferred embodiment, the program code instructions for the MFD 20 are stored on the HDD 935 via an IC card. Alternatively, the program code instructions can be stored on the floppy 907 so that the program code instructions may be read by the FDD 936, transferred to the RAM 934 and executed by the CPU 931 to carry out the instructions. These instructions can be the instructions to perform the MFD's functions described above. These instructions permit the MFD 20 to interact with the document manager server 40 via browser 25 and to control the control panel 937 and the image processing units of the MFD 20.

During a start-up of the MFD 20, the program code instructions may be read by the CPU 931, transferred to the RAM and executed by the CPU 931. Alternatively, the program code instructions may be loaded to the ROM 933. It is therefore understood that in the present invention any of the floppy disk 907, the MFD 935, the RAM 934, and the ROM 933 correspond to a computer readable storage medium capable of storing program code instructions. Other devices and medium that can store the instructions according to the present invention include for example magnetic disks, optical disks including DVDs, magneto-optical disks such as MOS, and semiconductor memory cards such as PC cards.

In a preferred embodiment, the control panel 937 includes a display screen that displays information allowing the user of the MFD 20 to interact with the document manager server 40, such as the screen 300 shown in FIG. 3. The display screen can be a liquid crystal display (LCD), a plasma display device, or a cathode ray tube (CRT) display. The display screen does not have to be integral with, or embedded in, the control panel 937, but may simply be coupled to the control panel 937 by either a wire or a wireless connection. The control panel 937 may include keys for inputting information or requesting various operations. Alternatively, the control panel 937 and the display screen may be operated by a keyboard, a mouse, a remote control, touching the display screen, voice recognition, or eye-movement tracking, or a combination thereof.

Figure 13:
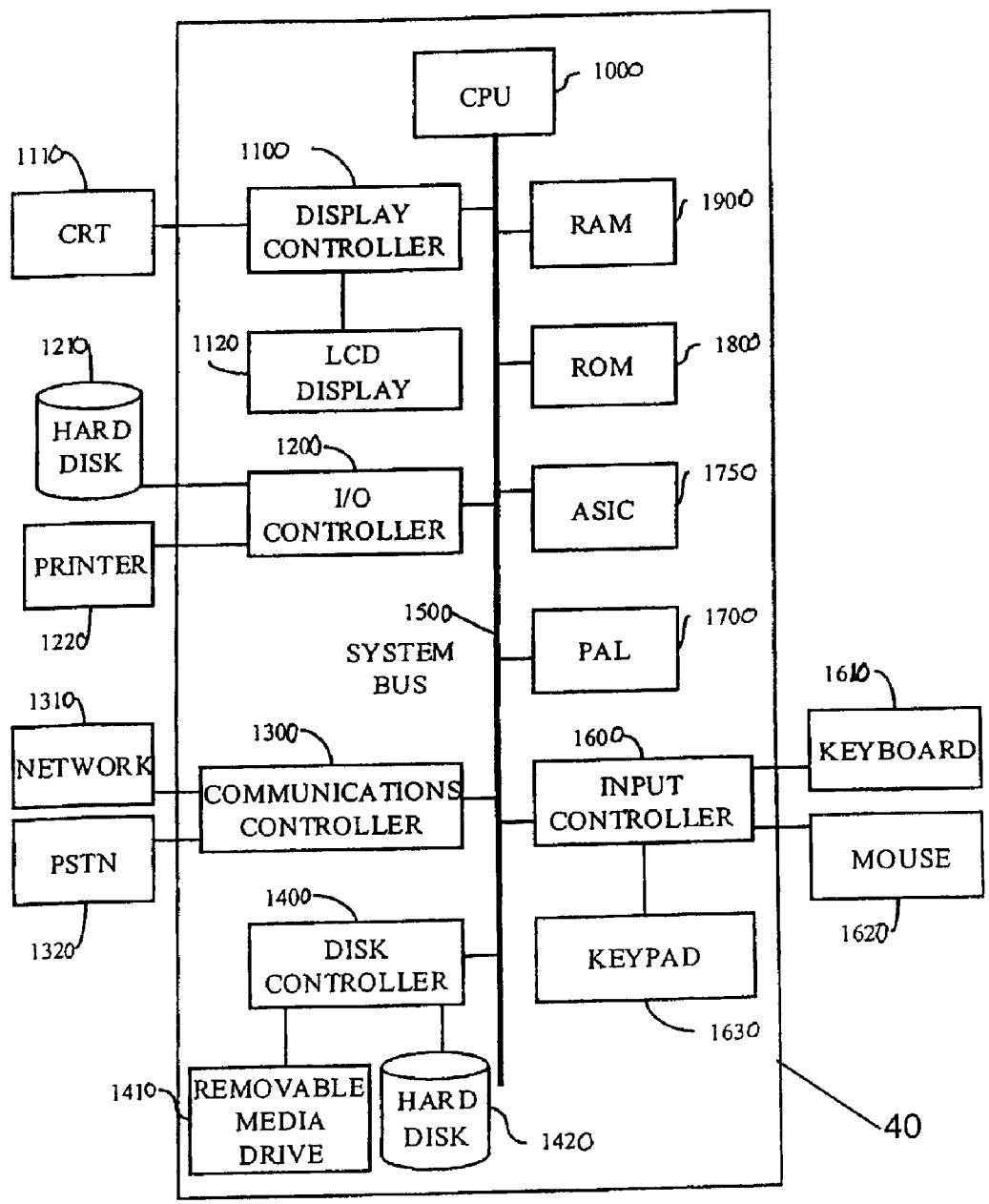
FIG. 13 is a block diagram illustrating a document manager server according to one embodiment of the present invention.
Figure 14:
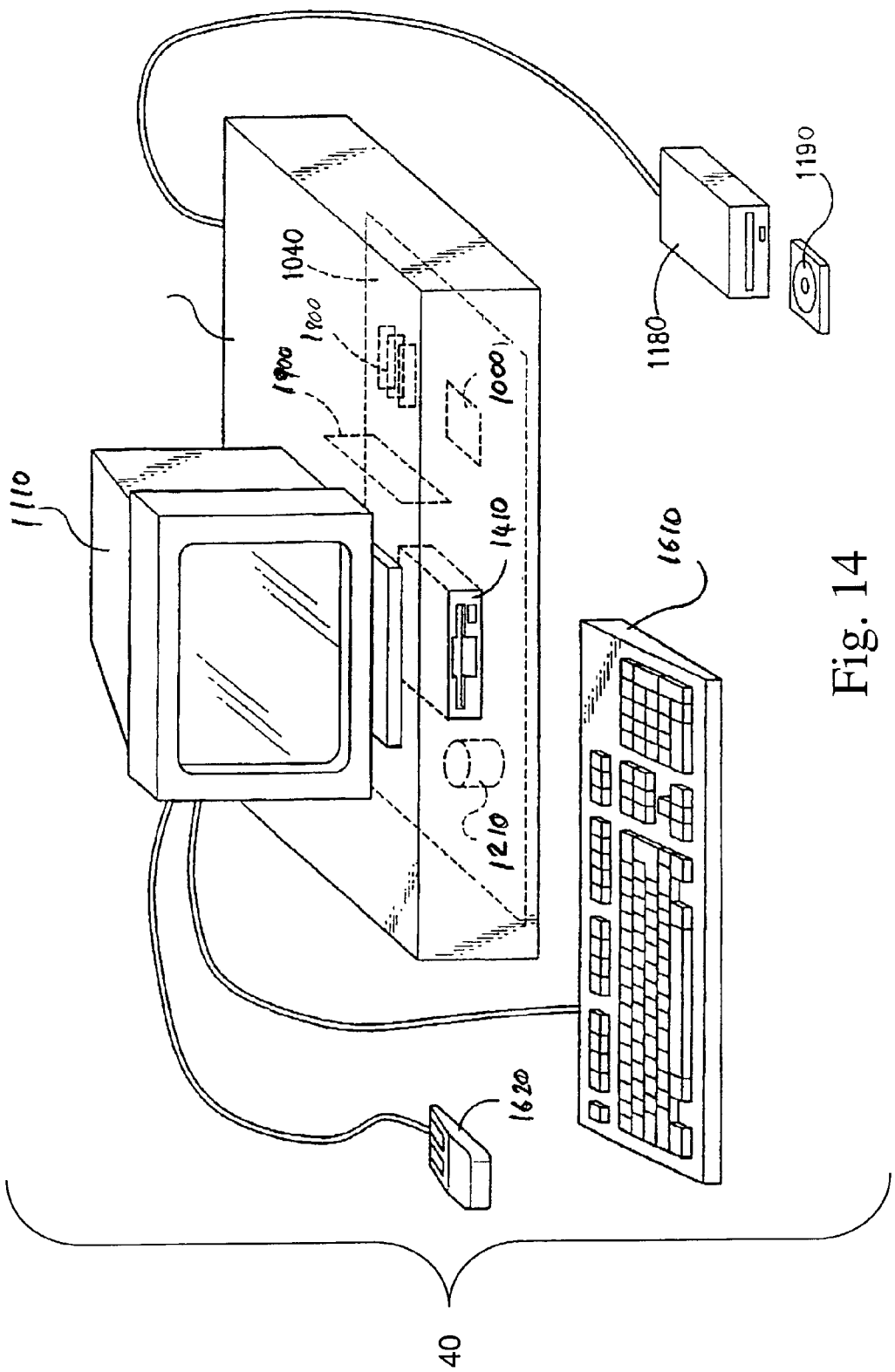
FIG. 14 is a schematic representation of a document manager server according to one embodiment of the present invention.

FIG. 13 is a block diagram of the server 40 according to one embodiment of the present invention. FIG. 14 is a schematic representation of the server 40. The server 40 includes a central processing unit 1000 (CPU) that communicates with a number of other devices by way of a system bus 1500. The server 40 includes a random access memory (RAM) 1900 that hosts temporary storage values used in implementing the authenticating, routing and managing functions of documents.

A conventional personal computer or computer workstation with sufficient memory and processing capability may also be configured to operate as the server 40. The central processing unit 1000 is configured for high volume data transmission and performing a significant number of mathematical calculations in processing communications and database searches. A Pentium III microprocessor such as the 1 GHz Pentium III manufactured by Intel Inc. may be used for the CPU 1000. This processor employs a 32 bit architecture. Other suitable processors include the Motorola 500 MHZ PowerPC G4 processor and the Advanced Micro Devices 1 GHz AMD Athlon processor. Multiple processors or workstations may be used as well.

The ROM 1800 is preferably included in a semiconductor form although other read-only memory forms including optical media may be used to host application software and temporary results. The ROM 1800 connects to the system bus 1500 for use by the CPU 1000. The ROM 1800 includes computer readable instructions that, when executed by the CPU 1000, can perform the different authenticating, routing and managing functions discussed above associated with scanned documents from MFDs. An input controller 1600 connects to the system bus 1500 and provides an interface with various peripheral equipment including a keyboard 1610 and a pointing device such as a mouse 1620. The input controller 1600 may include different ports such as a mouse port in the form of a PS2 port or, for example, a universal serial bus (USB) port. The keyboard port for the input controller 1600 is in the form of a mini-DIN port although other connectors may be used as well. The input controller 1600 provides sound card connections so that external jacks on the sound card allow users to attach microphone speakers or an external sound source. The input controller 1600 also may include serial ports or parallel ports as well.

A disk controller 1400 is in the form of an IDE controller and connects via ribbon cables to a floppy disk drive 1410 as well as a hard disk drive 1420, a CD-ROM drive 1180 and a compact disk 1190 (FIG. 12). In addition, a PCI expansion slot is provided on the disk controller 1400 or mother board that hosts the CPU 1000. An enhanced graphic port expansion slot is provided and provides 3-D graphics with fast access to the main memory. The hard disk 1210 may also include a CD-ROM that may be readable as well as writeable. A communication controller 1300 provides a connection, for example by way of an Ethernet connection to a network 1310, which can be the network 100. In one embodiment, the network 1310 and the connection to the communication controller 1300 are made by way of a plurality of connections including a cable-modem connection, DSL connection, dial-up modem connection, and the like that connect to the communication controller 1300.

An input/output controller 1200 also provides connections to external components such as an external hard disk 1210, printer 1220, which can be MFD 10–30, for example, by way of an RS 232 port, a SCSI bus, an Ethernet or other network connection which supports any desired network protocol such as, but not limited to TCP/IP, IPX, IPX/SPX, or NetBEUI.

A display controller 1100 interconnects the system bus 1500 to a display device, such as a cathode ray tube (CRT) 1110. While a CRT is shown, a variety of other display devices may be used such as an LCD (liquid crystal display), or plasma display device.

The mechanisms and processes set forth in the present description may be implemented using a conventional general purpose microprocessor(s) programmed according to the teachings of the present specification, as will be appreciated to those skilled in the relevant arts. Appropriate software coding can readily be prepared by skilled programmers based on the teachings of the present disclosure, as will also be apparent to those skilled in the software art. In particular, the computer program product for authenticating, routing, and managing documents according to the present invention can be written in a number of computer languages including but not limited to C, C++, Fortran, and Basic, as would be recognized by those of ordinary skill in the art. The invention may also be implemented by the preparation of applications specific integrated circuits or by interconnecting an appropriate network of conventional component circuits, as will be readily apparent to those skilled in the art.

The present invention thus also includes a computer-based product that may be hosted on a storage medium and include instructions that can be used to program a computer to perform a process in accordance with the present invention. This storage medium can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions.

Additional Benefits of the Present Invention

Historically, business applications ran on mainframe computers and users executed operations from terminal consoles by sending instruction commands. The terminal consoles had no computing power other than displaying data stream sent back from the mainframe computer which ran the actual applications. As LAN (Local Area Network) became available, the Client—Server architecture was introduced. The Client—Server architecture utilizes the client computer's computing power to offload the mainframe from data processing, resulting in a more efficient use of the resources and better overall performance.

This Client—Server technology introduced a new problem however. Each and every computer needs to have an application program installed. Installation, upgrades, and maintenance of the client require a lot of time and human support, which increase operation cost. Furthermore, this approach lacks flexibility because different versions of applications on clients and servers should match.

Once introduced, the web browser was well accepted because it not only solves the problems of the Client—Server architecture but it also allows the user to maintain the benefit of distributed computing. Specifically, the web browser eliminates the need for client program maintenance because application programs and/or web pages are loaded dynamically at the time the user accesses the web site. The user is guaranteed to have the latest version of the application. As a result, PCs no longer need to have application programs installed manually and permanently on their local hard disk. This is why a PC web browser is sometimes referred to as "thin client technology;" it is free from relatively bulky application programs.

The MFD browser according to the present invention provides the benefits of thin client technology to MFDs because it does not need manual program installation or program upgrade but still guarantees the latest and/or only appropriate software loaded from a web site. Once the MFD browser is incorporated in the MFD, a web server can identify the capabilities of the MFD and dynamically download and run selected programs by a predefined criterion. This criterion can be used to run different types of applications by department, e.g. a patent search and a print program for a legal department or a resume management application for a human resources department. Advantageously, the present invention can be incorporated into the system and method for managing documents disclosed in co-pending Ser. No. 09/795,438, filed Mar. 1, 2001, the entire content of which is hereby incorporated by reference.

Obviously, numerous additional modifications and variations of the present invention are possible in light of the above teachings. It is therefore to be understood that within the scope of the appended claims the present invention may be practiced otherwise than as specifically described herein.

What is claimed as new and desired to be secured by Letters Patent of the United States is:

1. A method for managing documents, comprising the steps of:
   receiving an identification information at a document manager server from an image processing device;
   looking up said identification information in a registrar;
   if said identification information is in said registrar, transmitting a profile to said image processing device, wherein said profile includes information about an application connected to said document manager server; and
   if said identification information is not in said registrar; comparing a number of registered image processing devices with a predetermined number,
      if said number of registered image processing devices is less than said predetermined number, registering said image processing device and transmitting said profile to said image processing device, and
      if said number of registered image processing devices is equal to said predetermined number, transmitting a message to said image processing device, wherein said message indicates that said application is not available to said image processing device.

2. The method of claim 1, wherein said identification information comprises a serial number of said image processing device.

3. A system for managing documents, comprising:
   means for receiving an identification information at a document manager server from an image processing device;
   means for looking up a profile based on said identification information at said document manager server, wherein said profile includes information about an application connected to said document manager server via a network; and
   means for transmitting said profile from said document manager server to said image processing device.

4. The system of claim 3, wherein said identification information comprises a serial number of said image processing device.

5. The system of claim 3, wherein said identification information comprises a group identification for said image processing device.

6. The system of claim 3, further comprising:
   means for inquiring at said document manager server whether said image processing device is registered.

7. The system of claim 6, further comprising:
   means for registering said image processing device with said document manager server.

8. The system of claim 6, further comprising:
   means for receiving a job information at said document manager server from said image processing device;

means for processing said job information at said document manager server; and means for transmitting a processed information from said document manager server to said application connected to said document manager server.

9. The system of claim 8, wherein said job information is login information related to a user of said image processing device.

10. The system of claim 8, wherein said job information is a request for a destination information, and wherein said application connected to said document manager server is a directory server.

11. The system of claim 10, wherein said destination information comprises an e-mail address.

12. The system of claim 10, wherein said destination information comprises a fax number.

13. The system of claim 10, further comprising:

means for receiving said destination information at said document manager server from said directory server;

means for transmitting said destination information from said document manager server to said image processing device;

means for receiving at said document manager server from said image processing device a document and a request for routing said document; and means for routing said document from said document manager server in accordance with said request for routing.

14. The system of claim 13, wherein said destination information comprises an e-mail address, and said means for routing said document comprises means for transmitting said document to an e-mail server with a request for e-mailing said document to said e-mail address.

15. The system of claim 13, wherein:

said destination information comprises a fax number, and said means for routing said document comprises means for transmitting said document to a fax server with a request for faxing said document to said fax number.

16. The system of claim 8, wherein said job information is a document, and said application connected to said document manager server is an e-mail server.

17. The system of claim 8, wherein said job information is a document, and said application connected to said document manager server is fax server.

18. The system of claim 8, wherein said job information is a document, and said application connected to said document manager server is a file format conversion system.

19. The system of claim 8, wherein said job information is a document, and said application connected to said document manager server is an optical character recognition system.

20. The system of claim 8, wherein said job information is a document, and said application connected to said document manager server is a document management system.

21. The system of claim 8, wherein said job information is a document, and said application connected to said document manager server is a file storage system.

22. The system of claim 8, wherein said job information is a document, and said means for transmitting said processed information transmits to a plurality of applications connected to said document manager server.

23. The system of claim 22, wherein said applications are grouped into a delivery system group, a middle processing group, and a backend system group.

24. The system of claim 23, wherein:

said delivery system group comprises an e-mail server and a fax server;

said middle processing group comprises a file format conversion system and an optical character recognition system, and said backend system group comprises a document management system and a file storage system.

25. The system of claim 24, wherein said means for transmitting said processed information transmits to at least one application from said delivery system group, and to only one application from said backend system group.

26. The system of claim 25, wherein said means for transmitting said processed information transmits to only one application from said middle processing group.

27. The system of claim 8, wherein said means for receiving and transmitting receive and transmit data using an HTTP protocol and an XML format.

28. A system for managing documents, comprising:

means for receiving an identification information at a document manager server from an image processing device;

means for looking up said identification information in a registrar;

means for transmitting a profile to said image processing device if said identification information is in said registrar, wherein said profile includes information about an application connected to said document manager server;

means for comparing a number of registered image processing devices with a predetermined number if said identification information is not in said registrar;

means for registering said image processing device and transmitting said profile to said image processing device if said number of registered image processing devices is less than said predetermined number; and means for transmitting a message to said image processing device if said number of registered image processing devices is equal to said predetermined number, wherein said message indicates that said application is not available to said image processing device.

29. The system of claim 28, wherein said identification information comprises a serial number of said image processing device.

30. A system for managing documents, comprising:

a document manager server configured to receive identification information from an image processing device;

the document manager server configured to look up said identification information in a registrar;

the document manager server configured to transmit a profile to said image processing device if said identification information is in said registrar, wherein said profile includes information about an application connected to said document manager server; and the document manager server configured to compare a number of registered image processing devices with a predetermined number if said identification information is not in said registrar, the document manager server configured to register said image processing device and transmit said profile to said image processing device if said number of registered image processing devices is less than said predetermined number, and the document manager server configured to transmit a message to said image processing device if said number of registered image processing devices is equal to said predetermined number, wherein said message indicates that said application is not available to said image processing device.

31. The system of claim 30, wherein said identification information comprises a serial number of said image processing device.

32. The system of claim 30, wherein said identification information comprises a group identification for said image processing device.

33. The system of claim 30, wherein said document manager server is further configured to:
receive job information from said image processing device;
process said job information; and
transmit said processed job information to said application connected to said document manager server.

34. The system of claim 33, wherein said job information is login information related to a user of said image processing device.

35. The system of claim 33, wherein said job information is a request for a destination information, and wherein said application connected to said document manager server is a directory server.

36. The system of claim 35, wherein said destination information comprises an e-mail address.

37. The system of claim 35, wherein said destination information comprises a fax number.

38. The system of claim 35, wherein said document manager server is further configured to:
receive said destination information from said directory server;
transmit said destination information to said image processing device;
receive, from said image processing device, a document and a request for routing said document; and
route said document from said document manager server in accordance with said request for routing.

39. The system of claim 38, wherein said destination information comprises an e-mail address, and
said document server is configured to route said document by transmitting said document to an e-mail server with a request for e-mailing said document to said e-mail address.

40. The system of claim 38, wherein:
said destination information comprises a fax number, and
said document server is configured to route said document by transmitting said document to a fax server with a request for faxing said document to said fax number.

41. The system of claim 33, wherein said job information is a document, and said application connected to said document manager server is an e-mail server.

42. The system of claim 33, wherein said job information is a document, and said application connected to said document manager server is fax server.

43. The system of claim 33, wherein said job information is a document, and said application connected to said document manager server is a file format conversion system.

44. The system of claim 33, wherein said job information is a document, and said application connected to said document manager server is an optical character recognition system.

45. The system of claim 33, wherein said job information is a document, and said application connected to said document manager server is a document management system.

46. The system of claim 33, wherein said job information is a document, and said application connected to said document manager server is a file storage system.

47. The system of claim 33, wherein said job information is a document, and said document server is configured to transmit said processed information to a plurality of applications connected to said document manager server.

48. The system of claim 47, wherein said applications are grouped into a delivery system group, a middle processing group, and a backend system group.

49. The system of claim 48, wherein:
said delivery system group comprises an e-mail server and a fax server;
said middle processing group comprises a file format conversion system and an optical character recognition system, and
said backend system group comprises a document management system and a file storage system.

50. The system of claim 49, wherein said document server is configured to transmit said processed information to at least one application from said delivery system group, and to only one application from said backend system group.

51. The system of claim 50 wherein said document manager server is configured to transmit said processed information to only one application from said middle processing group.

52. The system of claim 33, wherein said document manager server is configured to transmit and receive data using an HTTP protocol and an XML format.

* * * * *